United States Patent [19]

Nelson

[11] Patent Number: 4,721,737
[45] Date of Patent: Jan. 26, 1988

[54] IRRADIATED COLOR STABILIZED POLYSULFONE COMPOSITIONS

[75] Inventor: Linda H. Nelson, Evansville, Ind.

[73] Assignee: General Electric Company, Mt. Vernon, Ind.

[21] Appl. No.: 935,825

[22] Filed: Nov. 28, 1986

[51] Int. Cl.$^4$ ............................................... C08K 5/55
[52] U.S. Cl. .................................. 523/136; 523/300; 524/183; 524/184
[58] Field of Search ................ 523/136, 300; 524/183, 524/184

[56] References Cited

U.S. PATENT DOCUMENTS 4,211,679  7/1980  Mark et al. .......................... 524/183

Primary Examiner—Veronica P. Hoke
Attorney, Agent, or Firm—Myron B. Kapustij; Martin B. Barancik

[57] ABSTRACT

A composition sufficiently irradiated to achieve sterilization comprising a polysulfone resin in admixture with an anti-yellowing upon exposure to sterilizing irradiation effective amount of a boron compound having as part of its structure at least one

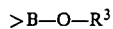

or

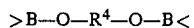

group wherein $R^3$ is selected from monovalent hydrocarbon radicals, substituted monovalent hydrocarbon radicals, monovalent hydrocarbonoxy radicals, or halogen radicals, and $R^4$ is selected from divalent hydrocarbon radicals or substituted divalent hydrocarbon radicals.

22 Claims, No Drawings

IRRADIATED COLOR STABILIZED POLYSULFONE COMPOSITIONS

BACKGROUND OF THE INVENTION

Polysulfone resins are well known thermoplastic materials which, due to their many advantageous properties, find use as thermoplastic engineering materials. Because of their excellent mechanical properties polysulfone resins have been proposed for various utilities including those related to the medical field such as those relating to medical packaging, for example, containers in which syringes, surgical instruments, intravenous fluids, operating room devices, and the like are stored or maintained. Additionally, the polysulfones have been proposed for medical devices such as blood oxygenators, anesthesia canisters, blood leak detectors, blood centrifuge bowls, surgical instruments and operating room instruments. The toughness of the polysulfones as well as their optical clarity, high heat resistance, strength, and physiological inertness render them suitable for use in this area of medical devices and packaging. However, in order to be used in the medical field, as well as in some other areas, sterilization of these articles is often required.

A typical method of sterilizing various articles and objects useful in the medical field is through irradiation. The type of radiation usually employed is low level gamma or electron beam radiation. It is readily apparent that the level of such radiation which accomplishes the sterilization is significantly above that of ordinary background radiation. When exposed to radiation of sufficient intensity and duration to sterilize various objects made from polysulfone resins the resin material is subject to yellowing. This yellowing of the polysulfone changes the color of the resin, thus reducing its utility for this particular application. Not only packaging materials such as flexible polysulfone films and sheet products but also molded parts as well suffer from this yellowing phenomonon.

A new family of additives has been discovered which inhibits or reduces yellowing of polysulfone polymers after exposure to sterilizing irradiation. By sterilizing irradiation is meant irradiation which kills microorganisms.

SUMMARY OF THE INVENTION

In accordance with the instant invention there are provided sterilizing radiation color stabilized polysulfone compositions which contain an amount of stabilizing or anti-yellowing compound which is effective to inhibit or reduce yellowing upon exposure of said compositions to sterilizing radiation. The stabilizing or anti-yellowing compounds of the present invention are certain boron compounds.

DESCRIPTION OF THE INVENTION

It has been discovered that polysulfone resins can be stabilized against yellowing upon exposure to sterilizing radiation by the use of certain boron compounds which function to decrease yellowing. More particularly, the polysulfone resins are admixed with an anti-yellowing upon exposure to sterilizing radiation effective quantity of a boron compound described in more detail hereinafter to form compositions which when exposed to sterilizing irradiation exhibit improved resistance to yellowing compared with neat polysulfone resin. The instant composition thus comprises:(i) at least one polysulfone resin; and (ii) an amount effective to stabilize said resin against yellowing of at least one boron compound upon exposure to sterilizng radiation.

The term "polysulfone resin" as used herein is intended to encompass those sulfone polymers containing the sulfone group. Such materials are well known in the art and are amply described in the literature, including, inter alia, U.S. Pat. No. 3,642,946; Modern Plastics Encyclopedia, 1977-78, pp. 108, 110-112; Kirk-Othmer, Encyclopedia of Chemical Technology, Second Edition, Vol. 16, pp. 272-281 (1969); and Handbook of Plastics and Elastomers, C.A. Harper, ed., McGraw-Hill, Inc., 1975, pp. 1-69 and 95-96, all of which are incorporated herein by reference. Representative polymers of this type include polysulfones, polyether sulfones, and polyphenyl sulfones.

The polysulfones that may be utilized in the instant invention contain at least one recurring structural unit represented by the general formula

$$+Ar-SO_2-Ar-O-Ar'-A-Ar'-O+ \quad (I)$$

wherein Ar and Ar' are independently selected from the group consisting of phenylene radicals, substituted phenylene radicals such as alkyl, alkoxy, halogen and nitro substituted phenylene; and A is selected from the group consiting of carbon-to-carbon bonds, alkylidene, cycloalkylidene, carbonyl, sulfoxide, sulfur, sulfone, azo, imino, and oxygen.

The polysulfones of Formula I are preferably derived from dichlorodiphenyl sulfones reacted with bisphenols. A second group of sulfones represented by Formula I are those wherein Ar and Ar' are phenylene and A is sulfone. A third major group of polysulfones represented by Formula I are those wherein Ar and Ar' are phenylene and A is oxygen, i.e., the polyarylethersulfones. When Ar is phenylene, it should preferably be either meta or para and may be substituted in the ring positions with alkyl groups such as methyl, ethyl and propyl. The alkoxy groups may be groups such as methoxy and propoxy. Particularly useful polysulfones are those derived from disulfonyl chlorides such as 4,4-biphenyl-disulfonyl chloride reacted with diphenyl ether.

The polysulfones useful in the present invention may be prepared in a variety of well known and conventional processes such as by nucleophilic substitution which is described in the Journal of Polymer Science, PTA-152375-98 (1967) or by condensation procedures which are described in British Pat. No. 1,060,546, both of which are incorporated by reference.

The poly(aryl ether sulfone) resins are additionally described in U.S. Pat. Nos. 4,286,705, 4,369,136, 3,264,536, and 4,108,837, all of which are incorporated herein by reference.

The poly(aryl ether sulfone) resins contain at least the following recurring structural units:

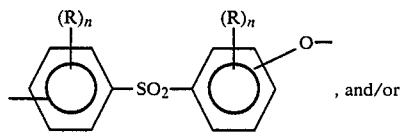

, and/or

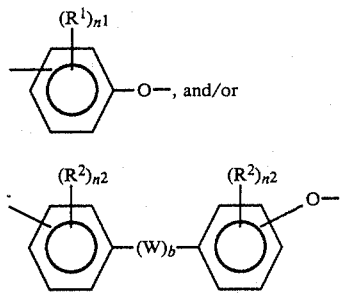

wherein R, R¹ and R² are independently selected from $C_1$-$C_6$ alkyl, $C_4$-$C_8$ cycloalkyl, and halogen radicals; W is a $C_2$-$C_8$ alkylene, a $C_1$-$C_8$ alkylidene, a cycloalkylene or cycloalkylidene radical containing from 4 to about 16 ring carbon atoms, b is either zero or one; and n, n¹ and n² are independently selected from integers having a value of from 0 to 4 inclusive.

A particularly useful poly(aryl ether sulfone) is one which contains at least one recurring structural unit represented by the formula

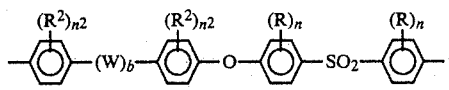

wherein R², R, W, b, n and n² are as defined hereinafore. Particularly useful polyarylethersulfones of Formula III are those wherein b is one and W is an alkylidene radical, preferably the isopropylidene radical. Of these types of polyarylethersulfones those wherein n and n² are zero are particularly useful. The preparation of these polyarylethersulfones, as well as the resins themselves, is described in U.S. Pat. No. 4,503,168, incorporated herein by reference.

The stabilizing compounds useful in the instant invention are those which when admixed with the aforedescribed polysulfones are effective in stabilizing the polysulfones against yellowing upon exposure to sterilizing radiation. That is to say, they are effective in reducing the yellowing of the polysulfone upon exposure to sterilizing radiation. These stabilizing compounds are selected from boron compounds which contain at least one group represented by the formula

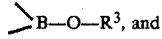

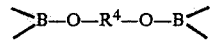

wherein R³ is a monovalent hydrocarbon radical, a substituted monovalent hydrocarbon radical, a monovalent hydrocarbonoxy radical, or a halogen radical; and R⁴ is a divalent hydrocarbon radical or a divalent substituted hydrocarbon radical.

The monovalent hydrocarbon radicals represented by R³ include the alkyl, cycloalkyl, alkenyl, aryl, aralkyl, and alkaryl radicals. The preferred alkyl radicals are those containing from 1 to about 24 carbon atoms. The preferred cycloalkyl radicals are those containing from 4 to about 14 carbon atoms. The preferred alkenyl radicals are those containing from 2 to about 24 carbon atoms. The preferred aryl radicals are those containing from 6 to about 14 carbon atoms. The preferred aralkyl and alkaryl radicals are those containing from 7 to about 16 carbon atoms.

The substituted monovalent hydrocarbon radicals are those monovalent hydrocarbon radicals as defined above which further contain from 1 to about 3 substituent groups. The preferred substituent groups are the halogens, and with phenyl radicals $C_1$-$C_6$ alkyls.

The monovalent hydrocarbonoxy radicals may be represented by the general formula —OR' wherein R' is a monovalent hydrocarbon radical of the type described for R³. The preferred monovalent hydrocarbonoxy radicals are the alkoxy radicals, with those alkoxy radicals containing from 1 to about 6 carbon atoms being preferred.

The divalent hydrocarbon radicals represented by R⁴ include the alkylene, alkenylene, cycloalkylene, arylene, alkarylene, and aralkylene radicals. The preferred alkylene radicals are those containing from 1 to about 24 carbon atoms. The preferred alkenylene radicals are those containing from 2 to about 24 carbon atoms. The preferred cycloalkylene radicals are those containing from 4 to about 16 carbon atoms. The preferred arylene radicals are those containing from 6 to 14 carbon atoms, e.g., phenylene, naphthylene, biphenylene, and the like. The preferred aralkylene and alkarylene radicals are those containing from 7 to about 16 carbon atoms.

The substituted divalent hydrocarbon radicals are those divalent hydrocarbon radicals as defined hereinafore containing from 1 to about 3 substituent groups. The preferred substituent groups are the halogen radicals, and with phenylene radicals alkyls.

Some illustrative non-limiting examples of these boron compounds include

wherein the individual R³ is the same or different;

wherein the individual R³ is the same or different, and R⁵ is an aryl, preferably containing from 6 to 14 carbon atoms, or an alkyl, preferably containing from one to about 24 carbon atoms, and is preferably an aryl radical;

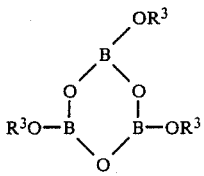

generally known as boroxine wherein each R³ is the same or different.

The above organoboron compounds are well known in the art and are amply described in the literature. They may be prepared by the methods described by Lappert in Chemical Reviews, 56, pp. 959–1064 (1956), incorporated herein by reference.

Also of significant interest and a preferred substructure are the organo biborates utilizing the divalent radical

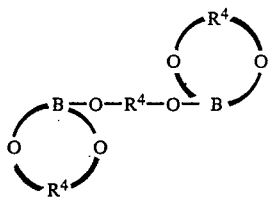

wherein $R^4$ is the same or different.

The biborates are also well known in the art and are amply described in the literature. They may be prepared by methods described in Kirk-Othmer, Encyclopedia of Chemical Technology, 4, 3rd Ed. (1978), pg. 116, incorporated herein by reference. Various biborates are available commercially from U.S. Borax Research, for example the biborate of trihexylene glycol and of tri(butylene glycol) available as Borester 7 and Borester 35, respectively.

When using $R^4$, as in the biborates, the divalent radical is the same as $R^3$ only a further hydrogen atom is missing, as aforementioned. Examples of such $R^4$ are alkylene instead of alkyl, cycloalkylene instead of cycloalkyl, alkenylene instead of alkenyl, arylene instead of aryl, and the like.

When making a biborate structure $B_2O_6R^4{}_3$, hexylene glycol, the final structure including the six membered alkylene group is

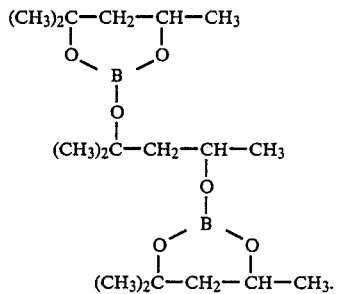

As used in the specification and claims, alkyl of one to twenty-four carbon atoms includes methyl, ethyl, propyl, isobutyl, pentyl, neopentyl, hexyl, 2,3-dimethylbutyl, 2,2,4-trimethyloctyl, decyl, isodecyl, lauryl, isoeicosyl, and the like. Alkenyl of two to twenty-four carbon atoms includes normal and branched alkenyl of the same type as mentioned for alkyl but containing one less hydrogen atom because of an unsaturate, a double bond, in the molecule. Cycloalkyl of four to fourteen carbon atoms includes cyclobutyl, cyclopentyl, cyclohexyl, cycloheptyl, cyclomyristyl, and the like. Aryl of 6 to 14 carbon atoms includes phenyl, biphenyl, naphthyl, and anthracenyl. Substituted aryl includes tolyl, o-xylyl, m-xylyl, p-xylyl, chlorobenzene, m-chlorotoluene, 1-butoxy naphthalene, n-hexachlorobenzene, and the like. Halogen is preferably chlorine and bromine.

The amount of the organoboron stabilizing compound present in the instant compositions is an amount which is effective to stabilize the polysulfone resin against yellowing upon exposure to sterilizing irradiation, i.e., reduce or retard yellowing of the resin. Generally, this amount is at least about 0.01 weight percent, preferably at least about 0.05 weight percent, and more preferably at least about 0.075 weight percent. Generally, an amount of about 5 weight percent, preferably about 2 weight percent, and more preferably about 1 weight percent should not be exceeded. Weight percent of the organoboron compound present is calculated based on the total amounts, by weight, of said organoboron compound and polysulfone resin present in the compositions.

It is to be understood that mixtures of two or more different organoboron compounds may also be used in the practice of the present invention. ZO The admixtures of the polysulfone resin and the organoboron compound are simply prepared by standard techniques, for example dry mixing and melt extruding at an elevated temperature. The extruded mixture is then molded into a piece of specific dimensions or further extruded into a film or sheet.

The resin and the organoboron compound are thoroughly mixed so that the boron compound is distributed as evenly as possible throughout the entire resin, including the interior thereof. The resultant articles prepared from the instant compositions thus have the stabilizer dispersed throughout said articles, e.g., in the interior and at surfaces. It is important that the stabilizing compound be dispersed throughout the entire article rather than being concentrated at the surfaces of these articles.

The compositions of the instant invention may optionally contain the well known and commonly used additives such as, for example, antioxidants; mold release agents; colorants; and flame retardants. Some useful flame retardants are the alkali and alkaline earth metal salts of organic sulfonic acids.

DESCRIPTION OF THE PREFERRED EMBODIMENT

In order to more fully and clearly illustrate the present invention the following examples are set forth. It is intended that the examples be considered as illustrative rather than limiting the invention as disclosed and claimed herein. In the examples all parts and percentages are parts and percentages by weight unless otherwise specified.

The following example falls outside the scope of the instant invention and is presented for comparative purposes only. This example is the control.

EXAMPLE 1

A polysulfone resin (UDEL 1700 from Union Carbide) was extruded on a Sterling single screw extruder (1¾") at a melt temperature of 600° F.

Test plaques ⅛" thick were injection molded using a 600° F. melt set temperature, a 200° F. mold set temperature, and a 10/20 cycle time on a 3 oz. Van Dorn. These test plaques were exposed to a $Co^{60}$ source on a continuous conveyor system, dosimetry was monitored with a calibrated NBS radiochromic, nylon dosimeter. The Y.I. (yellowness Index) was measured on a Gardner colorimeter in accordance with ASTM D1925 both before irradiation and after the test plaques had been exposed to 2.4/2.6 megarads (MRADS) and 5.8/5.9/6.1 megarads. The results of these Y.I. measurements are set forth in Table I.

The following example illustrates a composition of the instant invention.

EXAMPLE 2

A resin mixture was prepared by mixing together 100 parts by weight of the polysulfone resin used in Example 1 and 0.09 parts by weight of tri(hexylene) glycol biborate. Test plaques were prepared substantially in accordance with the procedure of Example 1. The Y.I. of these test plaques was determined in accordance with the procedure of Example 1. The results are set forth in Table I.

TABLE I

| Example No. | Additive | Y.I. (0 MRAD) | Y.I. (2.4/3.2 MRAD) | Y.I. (5.8/5.9/6.1 MRAD) |
| --- | --- | --- | --- | --- |
| 1 | none | 11.4 | 23.6 | 46.1 |
| 2 | tri(hexylene) glycol bi-borate | 11.8 | 22.8 | 36.7 |

As can be observed from the results set forth in Table I the composition having the boron compound (Example 2) has a lower Y.I. value after exposure to irradiation capable of sterilization than the control sample not having the boron compound (Example 1).

Obviously, other modifications and variations of the present invention are possible in light of the above teachings. It is, therefore, to be understood that changes may be made in the particular embodiments of the instant invention as described herein which are within the full intended scope of the invention as defined by the appended claims.

What is claimed is:

1. A composition sufficiently irradiated to achieve sterilization comprising:
   (i) at least one polysulfone resin; and
   (ii) an anti-yellowing upon exposure to sterilizing irradiation effective amount of at least one organo-boron compound having as part of its structure at least one

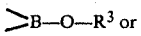

or

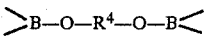

group wherein $R^3$ is selected from monovalent hydrocarbon radicals, substituted monovalent hydrocarbon radicals, monovalent hydrocarbonoxy radicals, or halogen radicals, and $R^4$ is selected from divalent hydrocarbon radicals or substituted divalent hydrocarbon radicals.

2. The composition of claim 1 wherein $R^3$ is selected from alkyl radicals containing from 1 to about 24 carbon atoms, alkenyl radicals containing from 2 to about 24 carbon atoms, cycloalkyl radicals containing from 4 to about 14 carbon atoms, aryl radicals containing from 6 to about 14 carbon atoms, substituted phenyl radicals wherein there are 1 to 3 substituent groups which may be the same or different and are alkyl of from 1 to about 6 carbon atoms, alkaryl radicals containing from 7 to about 16 carbon atoms, aralkyl radicals containing from 7 to about 16 carbon atoms, or halogen radicals.

3. The composition of claim 1 wherein $R^4$ is selected from alkylene radicals containing from 1 to about 24 carbon atoms, alkenylene radicals containing from 2 to about 24 carbon atoms, cycloalkylene radicals containing from 4 to about 14 carbon atoms, arylene radicals containing from 6 to about 14 carbon atoms, substituted phenylene radicals wherein there are 1 to 3 substitutent groups which may be the same or different and are alkyl of from 1 to about 6 carbon atoms, aralkylene radicals containing from 7 to about 16 carbon atoms, or alkarylene radicals containing from 7 to about 16 carbon atoms.

4. The composition of claim 1 wherein the boron compound is represented by the formula $B(OR^3)_3$.

5. The composition of claim 1 wherein the boron compound is represented by the formula

wherein $R^5$ is an aryl radical.

6. The composition of claim 1 wherein the boron compound is represented by the formula

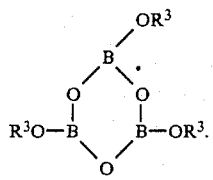

7. The composition of claim 1 wherein the boron compound is represented by the formula

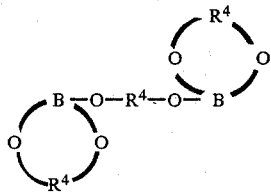

8. The composition of claim 1 wherein said polysulfone resin is a polyarylethersulfone resin.

9. The composition of claim 1 wherein the boron compound is present in from about 0.01 to about 5 weight percent.

10. The composition of claim 9 wherein the boron compound is present in form about 0.05 to about 2 weight percent.

11. The composition of claim 10 wherein the boron compound is present in from about 0.075 to about 1 weight percent.

12. A composition comprising:
   (i) at least one polysulfone resin; and
   (ii) an anti-yellowing upon exposure to sterilizing irradiation effective amount of at least one organo-boron compound having as part of its structure at least one

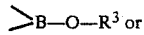

or

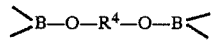

group wherein $R^3$ is selected from monovalent hydrocarbon radicals, substituted monovalent hydrocarbon radicals, monovalent hydrocarbonoxy radicals, or halogen radicals, and $R^4$ is selected from divalent hydrocarbon radicals or substituted divalent hydrocarbon radicals.

13. The composition of claim 12 wherein $R^3$ is selected from alkyl radicals containing from 1 to about 24 carbon atoms, alkenyl radicals containing from 2 to about 24 carbon atoms, cycloalkyl radicals, containing from 4 to about 14 carbon atoms, aryl radicals containing from 6 to about 14 carbon atoms, substituted phenyl radicals wherein there are 1 to 3 substituent groups which may be the same or different and are alkyl of from 1 to about 6 carbon atoms, alkaryl radicals containing from 7 to about 16 carbon atoms, aralkyl radicals containing from 7 to about 16 carbon atoms, or halogen radicals.

14. The composition of claim 12 wherein $R^4$ is selected from alkylene radicals containing from 1 to to about 24 carbon atoms, alkenylene radicals containing from 2 to about 24 carbon atoms, cycloalkylene radicals containing from 4 to about 14 carbon atoms, arylene radicals containing from 6 to about 14 carbon atoms, substituted phenylene radicals wherein there are 1 to 3 substituent groups which may be the same or different and are alkyl of from 1 to about 6 carbon atoms, aralkylene radicals containing from 7 to about 16 carbon atoms, or alkarylene radicals containing from 7 to about 16 carbon atoms.

15. The composition of claim 12 wherein the boron compound is represented by the formula $B(OR^3)_3$.

16. The composition of claim 12 wherein the boron compound is represented by the formula $R^5B(OR^3)_2$ wherein $R^5$ is an aryl radical.

17. The composition of claim 12 wherein the boron compound is represented by the formula

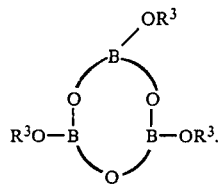

18. The composition of claim 12 wherein the boron compound is represented by the formula

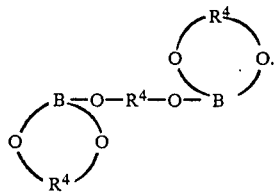

19. The composition of claim 12 wherein said polysulfone resin is a polyarylethersulfone resin.

20. The composition of claim 12 wherein the boron compound is present in from about 0.01 to about 5 weight percent.

21. The composition of claim 20 wherein the boron compound is present in from about 0.05 to about 2 weight percent.

22. The composition of claim 21 wherein the boron compound is present in from about 0.075 to about 1 weight percent.

* * * * *